(12) United States Patent
Byun et al.

(10) Patent No.: US 10,343,671 B2
(45) Date of Patent: Jul. 9, 2019

(54) POWER TRANSMISSION APPARATUS OF HYBRID ELECTRIC VEHICLE

(71) Applicants: Hyundai Motor Company, Seoul (KR); Kia Motors Corporation, Seoul (KR)

(72) Inventors: SungGon Byun, Anyang-si (KR); Chulmin Ahn, Busan (KR); Seok Joon Kim, Yongin-si (KR); Junyoung Ha, Ulsan (KR); Baekyu Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 131 days.

(21) Appl. No.: 15/638,033

(22) Filed: Jun. 29, 2017

(65) Prior Publication Data

US 2018/0162346 A1  Jun. 14, 2018

(30) Foreign Application Priority Data

Dec. 12, 2016 (KR) .......................... 10-2016-0168881

(51) Int. Cl.
| | |
|---|---|
| *B60K 6/48* | (2007.10) |
| *B60K 6/54* | (2007.10) |
| *F16H 3/72* | (2006.01) |
| *B60W 10/115* | (2012.01) |
| *B60K 6/485* | (2007.10) |

(Continued)

(52) U.S. Cl.
CPC ............ *B60W 10/115* (2013.01); *B60K 6/24* (2013.01); *B60K 6/26* (2013.01); *B60K 6/365* (2013.01); *B60K 6/387* (2013.01); *B60K 6/445* (2013.01); *B60K 6/485* (2013.01); *B60K 6/54* (2013.01); *F16H 3/44* (2013.01); *F16H 3/72* (2013.01); *F16H 3/089* (2013.01);

(Continued)

(58) Field of Classification Search
CPC . B60K 6/24; B60K 6/26; B60K 6/365; B60K 6/387; B60K 6/40; B60K 6/445; B60K 6/54
See application file for complete search history.

(56) References Cited

U.S. PATENT DOCUMENTS

| | | | | |
|---|---|---|---|---|
| 5,433,282 | A * | 7/1995 | Moroto ................. | B60K 6/365 180/65.21 |
| 5,513,719 | A * | 5/1996 | Moroto .................. | B60K 6/24 180/65.21 |

(Continued)

FOREIGN PATENT DOCUMENTS

JP     2011-057194 A     3/2004

*Primary Examiner* — David R Morris
(74) *Attorney, Agent, or Firm* — Morgan, Lewis & Bockius LLP

(57) ABSTRACT

A power transmission apparatus for a hybrid vehicle may include a planetary gear set as a torque branching device disposed on the same axis with the engine; and a final reduction device having a final reduction gear receiving a torque of the engine and a torque of the second motor/generator, wherein, the torque of the engine is delivered to the final reduction gear through the planetary gear set, an intermediate shaft, and an output gear formed on an output shaft, and the torque of the second motor/generator is delivered to the final reduction gear through a shifting device facilitating multi-stages of torque transmission.

6 Claims, 5 Drawing Sheets

(51) Int. Cl.
  *B60K 6/387* (2007.10)
  *B60K 6/24* (2007.10)
  *B60K 6/26* (2007.10)
  *B60K 6/365* (2007.10)
  *F16H 3/44* (2006.01)
  *B60K 6/445* (2007.10)
  *F16H 3/089* (2006.01)
  *F16H 3/08* (2006.01)

(52) U.S. Cl.
  CPC ... *F16H 2003/0815* (2013.01); *Y02T 10/6226* (2013.01); *Y02T 10/6295* (2013.01)

(56) References Cited

U.S. PATENT DOCUMENTS

| | | | |
|---|---|---|---|
| 6,695,736 B2 | 2/2004 | Takenaka | |
| 7,086,977 B2 * | 8/2006 | Supina | B60W 20/30 475/5 |
| 7,220,200 B2 * | 5/2007 | Sowul | B60K 6/365 180/65.22 |
| 7,727,112 B2 * | 6/2010 | Kakinami | B60W 20/30 477/79 |
| 7,794,357 B2 * | 9/2010 | Imamura | B60K 6/38 477/4 |
| 7,811,190 B2 * | 10/2010 | Tabata | B60K 6/26 475/5 |
| 7,988,579 B2 * | 8/2011 | Tabata | B60K 6/40 475/5 |
| 8,888,636 B2 * | 11/2014 | Ikegami | B60K 6/365 475/207 |
| 9,140,343 B1 * | 9/2015 | Kim | B60K 6/365 |
| 9,180,875 B2 * | 11/2015 | Choi | B60K 6/365 |
| 9,199,529 B2 * | 12/2015 | Park | B60K 6/445 |
| 9,212,734 B1 * | 12/2015 | Kim | B60K 6/365 |
| 9,297,447 B2 * | 3/2016 | Kim | F16H 37/046 |
| 9,315,096 B2 * | 4/2016 | Ahn | B60K 6/42 |
| 9,321,341 B2 * | 4/2016 | Kim | B60K 6/36 |
| 9,321,344 B2 * | 4/2016 | Kim | B60K 6/50 |
| 9,333,848 B2 * | 5/2016 | Ono | B60K 6/365 |
| 9,365,102 B2 * | 6/2016 | Kim | B60K 6/36 |
| 9,387,754 B2 * | 7/2016 | Ahn | B60K 6/365 |
| 9,452,673 B2 * | 9/2016 | Kim | B60K 6/36 |
| 9,701,189 B2 * | 7/2017 | Lee | B60K 6/547 |
| 9,771,060 B2 * | 9/2017 | Cho | B60W 20/10 |
| 9,809,104 B2 * | 11/2017 | Kim | B60K 6/365 |
| 9,969,255 B2 * | 5/2018 | Kim | B60K 6/40 |
| 10,023,040 B2 * | 7/2018 | Kim | B60K 6/365 |

| | | | |
|---|---|---|---|
| 2001/0006919 A1 * | 7/2001 | Takenaka | B60K 6/36 475/5 |
| 2004/0166980 A1 * | 8/2004 | Supina | B60W 20/30 475/5 |
| 2006/0025263 A1 * | 2/2006 | Sowul | B60K 6/365 475/5 |
| 2007/0202987 A1 * | 8/2007 | Kakinami | B60W 20/30 477/3 |
| 2008/0190676 A1 * | 8/2008 | Imamura | B60K 10/10 180/65.235 |
| 2009/0082151 A1 * | 3/2009 | Tabata | B60K 6/26 475/5 |
| 2009/0098969 A1 * | 4/2009 | Tabata | B60K 6/365 475/5 |
| 2010/0125020 A1 | 5/2010 | Ikegami et al. | |
| 2010/0222171 A1 * | 9/2010 | Tabata | B60K 6/40 475/5 |
| 2014/0296013 A1 * | 10/2014 | Hata | B60K 6/365 475/5 |
| 2014/0371017 A1 * | 12/2014 | Ono | B60K 6/365 475/5 |
| 2015/0051036 A1 * | 2/2015 | Kim | B60K 6/50 475/5 |
| 2015/0099605 A1 * | 4/2015 | Choi | B60K 6/365 477/5 |
| 2015/0105202 A1 * | 4/2015 | Park | B60K 6/445 475/5 |
| 2015/0114175 A1 * | 4/2015 | Ahn | B60K 6/42 74/661 |
| 2015/0119178 A1 * | 4/2015 | Lee | B60K 6/547 475/5 |
| 2015/0119193 A1 * | 4/2015 | Kim | B60K 6/36 477/5 |
| 2015/0148171 A1 * | 5/2015 | Kim | B60K 6/36 475/5 |
| 2015/0167807 A1 * | 6/2015 | Ahn | B60K 6/365 475/5 |
| 2015/0167808 A1 * | 6/2015 | Kim | B60K 6/365 475/5 |
| 2016/0061305 A1 * | 3/2016 | Kim | F16H 37/046 475/5 |
| 2016/0101679 A1 * | 4/2016 | Kim | B60K 6/36 475/5 |
| 2016/0129900 A1 * | 5/2016 | Cho | B60W 20/10 701/22 |
| 2017/0305255 A1 * | 10/2017 | Kim | B60K 6/40 |
| 2018/0022199 A1 * | 1/2018 | Kim | B60K 6/365 475/5 |
| 2018/0119759 A1 * | 5/2018 | Kim | F16H 3/727 |

* cited by examiner

POWER TRANSMISSION APPARATUS OF HYBRID ELECTRIC VEHICLE

CROSS-REFERENCE(S) TO RELATED APPLICATIONS

The present application claims priority to Korean Patent Application No. 10-2016-0168881 filed on Dec. 12, 2016, the entire contents of which are incorporated herein for all purposes by this reference.

BACKGROUND OF THE INVENTION

Field of the Invention

The present invention relates to a power transmission apparatus for a hybrid vehicle.

Description of Related Art

An environmentally-friendly technology of a vehicle is a core technology which controls the survival of a future automobile industry, and advanced vehicle makers have focused their resources on the development of an environmentally-friendly vehicle to achieve environmental and fuel efficiency regulations.

Therefore, vehicle makers have developed an electric vehicle (EV), a hybrid electric vehicle (HEV), a fuel cell electric vehicle (FCEV), and the like, as future vehicle technologies.

Since the future vehicle has various technological restrictions including a weight and cost, the vehicle makers have paid attention to the hybrid electric vehicle as an alternative as a solution to a realistic problem for meeting exhaust gas regulations and improving fuel efficiency performance, and have entered into keen competition for commercializing the hybrid electric vehicle.

The hybrid electric vehicle is a vehicle using two or more power sources. The two or more power sources may be combined by various schemes and a gasoline engine or a diesel engine using the existing fossil fuel and a motor/generator driven by electrical energy are mixed and used as the power sources.

The hybrid electric vehicle generally uses an engine and a motor/generator, and uses as a primary power source a motor/generator having a relatively excellent low-speed torque characteristic at a low speed, and uses as the primary power source an engine having a relatively excellent high-speed torque characteristic at a high speed.

As a result, the hybrid electric vehicle is excellent in fuel efficiency enhancement and reduction of exhaust gas because an operation of the engine using fossil fuel stops and the motor/generator is used at a low-speed section.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a power transmission apparatus for a hybrid vehicle having the advantages of minimizing power loss caused by a rotation part unrelated to driving the vehicle in an EV mode.

An exemplary power transmission apparatus of the present invention is for a hybrid vehicle having an engine as a primary power source and first motor/generator and second motor/generator as auxiliary power sources disposed on a same axis with the engine. The power transmission apparatus includes a planetary gear set as a torque branching device disposed on the same axis with the engine, and a final reduction device having a final reduction gear receiving a torque of the engine and a torque of the second motor/generator, wherein, the torque of the engine is delivered to the final reduction gear through the planetary gear set, an intermediate shaft, and an output gear formed on an output shaft, and the torque of the second motor/generator is delivered to the final reduction gear through a shifting device facilitating multi-stages of torque transmission.

The first and second motor/generators, the planetary gear set, and the shifting device may be disposed in the order of the planetary gear set, the shifting device, the second motor/generator, and the first motor/generator, from an engine side.

The planetary gear set may be a single pinion planetary gear set having a sun gear, a ring gear, and a planet carrier.

The sun gear may be fixedly connected to the first motor/generator through a power delivery shaft, and selectively connectable to a transmission housing. The planet carrier may be fixedly connected to an input shaft to receive the torque of the engine. The ring gear may be externally gear-meshed with the intermediate shaft.

The intermediate shaft may be disposed in parallel with the input shaft. An intermediate input gear may be disposed on the intermediate shaft and is externally gear-meshed with an engine output gear directly connected to the ring gear of the planetary gear set. An intermediate output gear may be disposed on the intermediate shaft and is externally gear-meshed with of the output gear of the output shaft.

The shifting device may include a synchronizer device.

The shifting device may further include first forward and second speed drive gears disposed on a second motor shaft without an interference, the second motor shaft being fixedly connected to the second motor/generator and coaxially superposed with the power delivery shaft without an interference. The first forward and second speed drive gears may be synchronously connected to the second motor shaft, selectively by the synchronizer device. The first forward and second speed driven gears may be fixedly disposed on the output shaft and externally gear-meshed with the first forward and second speed drive gears.

Utilizing a power transmission apparatus for a hybrid vehicle according to an exemplary embodiment of the present invention, the torque of the second motor/generator (MG2) is output to the output gear (OG) through the shifting device (TM) facilitating two shift-stages. Thus, a required torque of the second motor/generator MG2 may be decreased, and a capacity of the second motor/generator MG2 may be decreased.

According to a power transmission apparatus for a hybrid vehicle of an exemplary embodiment of the present invention, a volume of the second motor/generator MG2 may become smaller in size, reducing an overall length and weight as well as a production cost.

In addition, according to a power transmission apparatus for a hybrid vehicle of an exemplary embodiment of the present invention, an overall length of an entire transmission and motors are reduced, since the second motor/generator MG2 may be reduced in size even though the shifting device MT may be added.

The methods and apparatuses of the present invention have other features and advantages which will be apparent from or are set forth in more detail in the accompanying drawings, which are incorporated herein, and the following Detailed Description, which together serve to explain certain principles of the present invention

Figure 1:
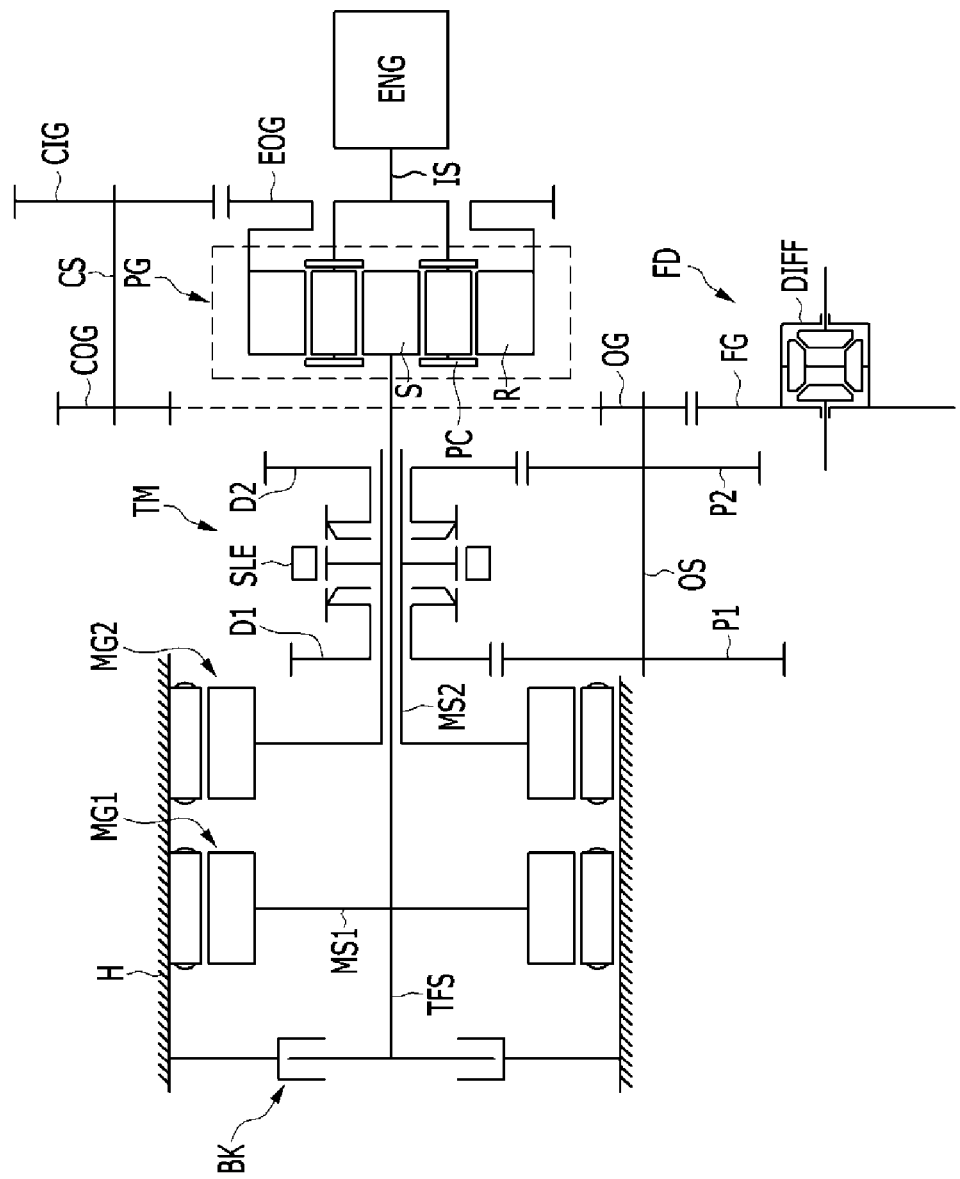
FIG. 1 is a schematic diagram of a power transmission apparatus for a hybrid vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following description, dividing names of components into first, second and the like is to divide the names because the names of the components are the same as each other and an order thereof is not particularly limited.

FIG. 1 is a schematic diagram of a power transmission apparatus for a hybrid vehicle according to an exemplary embodiment of the present invention.

Referring to FIG. 1, a power transmission apparatus for a hybrid vehicle, according to an exemplary embodiment of the present invention, includes an engine ENG and first and second motor/generators (MG1 and MG2 respectively) as power sources, a planetary gear set PG as a torque branching device, and a shifting device TM that enables multiple shift-stages in an EV mode driving.

The engine ENG is a primary power source and various kind of typical engines, including a gasoline engine or a diesel engine that uses fossil fuel. Torque outputted from the engine ENG is inputted to a power transmission apparatus through an input shaft IS.

The planetary gear set PG as a torque branching device is disposed on a same axis with the input shaft IS, the planetary gear set PG is a single pinion planetary gear set and includes rotation elements of a sun gear S, a planet carrier PC that supports a pinion P externally gear-meshed with the sun gear S, and a ring gear R internally gear-meshed with the pinion P.

In the planetary gear set PG, the sun gear S is disposed on a same axis with the input shaft IS, and directly connected to a power delivery shaft TFS connected to a transmission housing H via a brake BK. The planet carrier PC is directly connected to the input shaft IS, and the ring gear R is directly connected to an engine output gear EOG.

The first and second motor/generators MG1 and M2 perform both functions of a motor and a generator. The motor/generators MG1 and M2 may be formed as known in the art. That is, the motor/generators MG1 and M2 include a stator fixed to a transmission housing and a rotor which is rotatable inside the stator. First and second motor shafts MS1 and MS2 are directly connected to the rotors of the motor/generators MG1 and M2, respectively.

The first and second motor/generators MG1 and MG2 are disposed on the power delivery shaft TFS. A first motor shaft MS1 of the first motor/generator MG1 is directly connected to the power delivery shaft TFS, and directly connected to the sun gear S of the planetary gear set PG. A second motor shaft MS2 of the second motor/generator MG2 is formed as a hollow shaft, and superposed on an external circumference of the power delivery shaft TFS without a rotational interference.

The shifting device TM is disposed on an external circumference of the second motor shaft MS2 of the second motor/generator MG2, as a synchronizer device.

In more detail, first forward and second speed drive gears D1 and D2 forming the synchronizer device are disposed on the second motor shaft MS2 without a rotational interference, and selectively synchronized with the second motor shaft MS2.

An output shaft OS is disposed in parallel with the second motor shaft MS2. First forward and second speed driven gears P1 and P2 are integrally formed on the output shaft OS and are externally gear-meshed with the first forward and second speed drive gears D1 and D2. An output gear OG is integrally formed at an end portion of the output shaft OS.

As a result, while a torque is input through the second motor shaft MS2, shifting to the first forward speed is realized when the synchronizer device synchronously engages the second motor shaft MS2 and the first forward speed drive gear D1, and shifting to the second forward speed is realized when the synchronizer device synchronously engages the second motor shaft MS2 and the second forward speed drive gear D2. The shifted torque of the shifting device TM is output to the output shaft through the first and second speed drive gears D1 and D2.

The synchronizer device forming the shifting device TM may be formed as known in the art, and a sleeve SLE employed in the synchronizer device may be connected to an actuator or that is controlled by a transmission control device.

The shifting device TM is utilized as a synchronizer device in the present embodiment, however, it should be noted that the scope of the invention is not limited thereto, since a variation including a dual clutch or a planetary gear set may be employed as the shifting device.

The torque output through the engine output gear EOG is delivered to the output gear OG of the output shaft OS through an intermediate shaft CS.

The intermediate shaft CS is disposed in parallel with the input shaft IS. An intermediate input gear CIG and an intermediate output gear COG are integrally formed on the intermediate shaft CS, respectively. The intermediate input gear CIG is externally gear-meshed with engine output gear EOG. The intermediate output gear COG is externally gear-meshed with the output gear OG.

As a result, the torque received from the ring gear R of the planetary gear set PG is transmitted to the output shaft OS through the intermediate shaft CS, and the torque received from the second motor/generator MG2 is transmitted to the output shaft OS through shifting device TM that enables two shift-stages.

The torques transmitted to the output shaft OS is transmitted to a final reduction gear FG of a final reduction device FD that includes a differential DIFF output gear OG.

Figure 2:
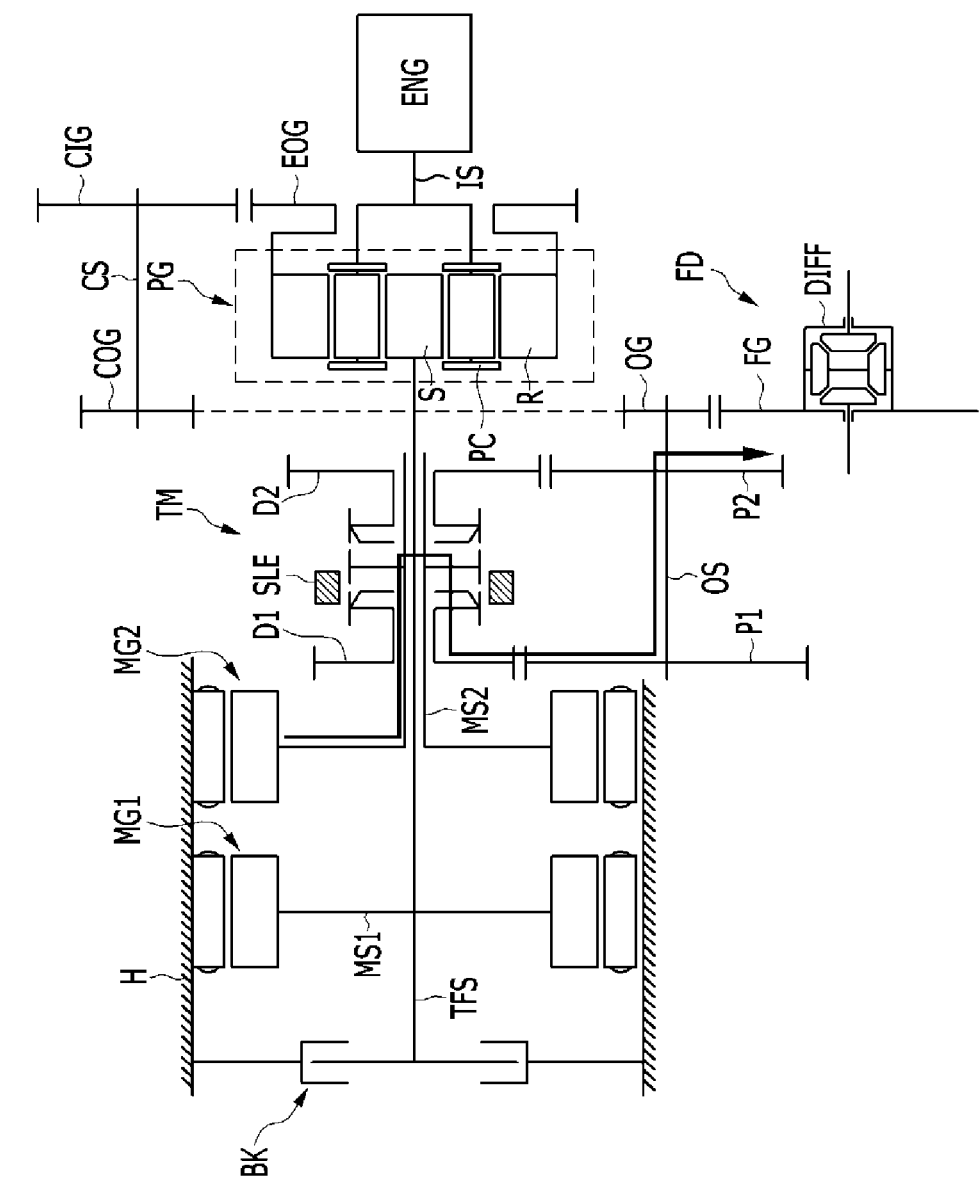
FIG. 2 shows a power delivery scheme in an EV mode 1 of a power transmission apparatus for a hybrid vehicle according to an exemplary embodiment of the present invention.

FIG. 2 shows a power delivery scheme in an EV mode 1 of a power transmission apparatus for a hybrid vehicle according to an exemplary embodiment of the present invention.

Referring to FIG. 2, in an EV mode 1, the engine ENG is maintained stopped and the second motor/generator MG2 is driven.

In the present state, since the sleeve SLE of the shifting device TM interconnects the first forward speed drive gear D1 with the second motor shaft MS2, the torque of the second motor/generator MG2 is transmitted to the final reduction gear FG of the final reduction device FD through the second motor shaft MS2, the first forward speed drive gear D1, the first forward speed driven gear P1, the output shaft OS, and the output gear OG.

Figure 3:
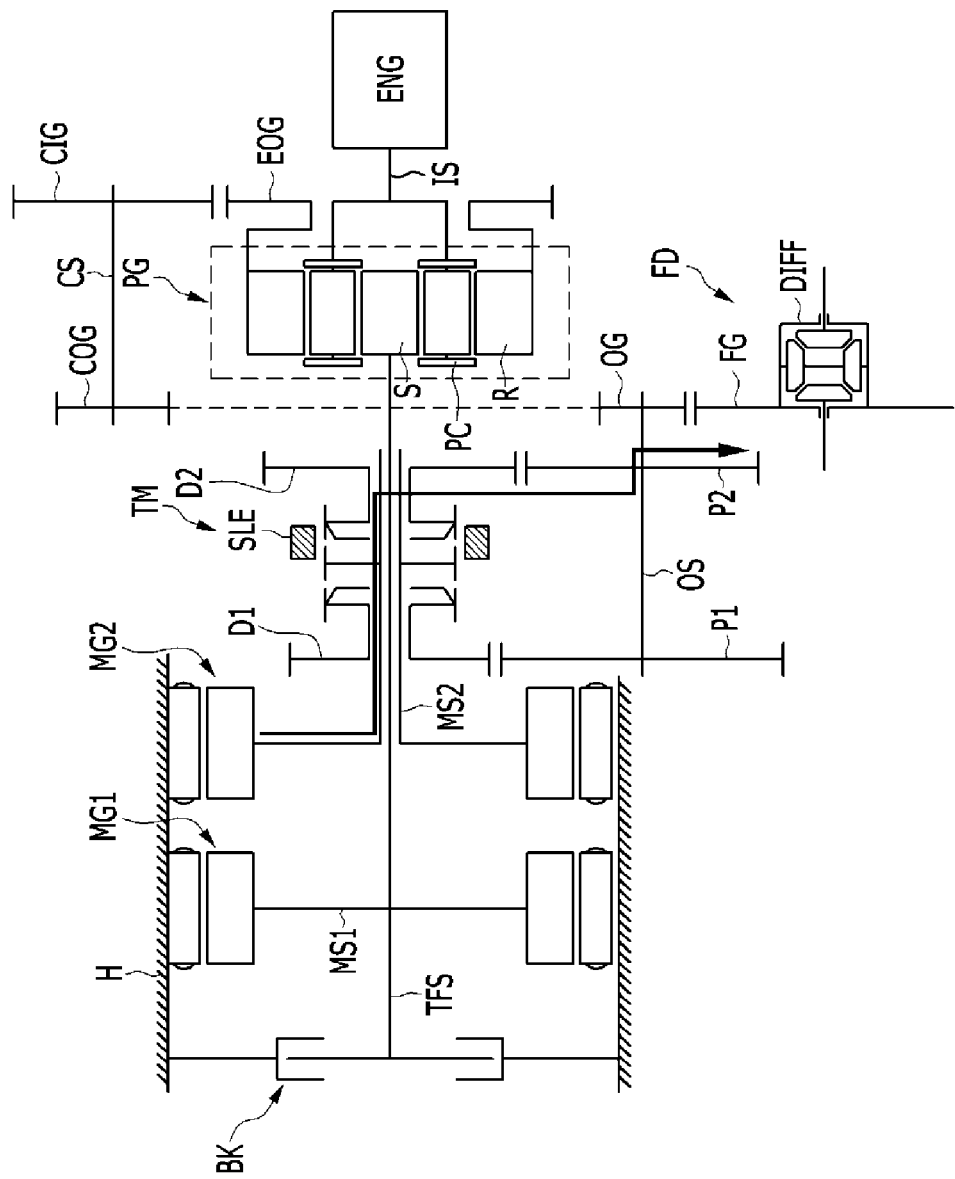
FIG. 3 shows a power delivery scheme in an EV mode 2 of a power transmission apparatus for a hybrid vehicle according to an exemplary embodiment of the present invention.

FIG. 3 shows a power delivery scheme in an EV mode 2 of a power transmission apparatus for a hybrid vehicle according to an exemplary embodiment of the present invention.

Referring to FIG. 3, in an EV mode 2, the engine ENG is maintained stopped and the second motor/generator MG2 is driven, the same as in the EV mode 1.

In the present state, the sleeve SLE of the shifting device TM interconnects the second forward speed drive gear D2 with the second motor shaft MS2, the torque of the second motor/generator MG2 is transmitted to the final reduction gear FG of the final reduction device FD through the second motor shaft MS2, the second forward speed drive gear D2, the second forward speed driven gear P2, the output shaft OS, and the output gear OG.

As described above, in the EV mode 1 and EV mode 2 of a power transmission apparatus for a hybrid vehicle according to an exemplary embodiment of the present invention, the torque of the second motor/generator MG2 is shifted between two shift-stages by the shifting device TM. Thus, a required torque of the second motor/generator MG2 may be decreased, and a capacity of the second motor/generator MG2 may be decreased.

Figure 4:
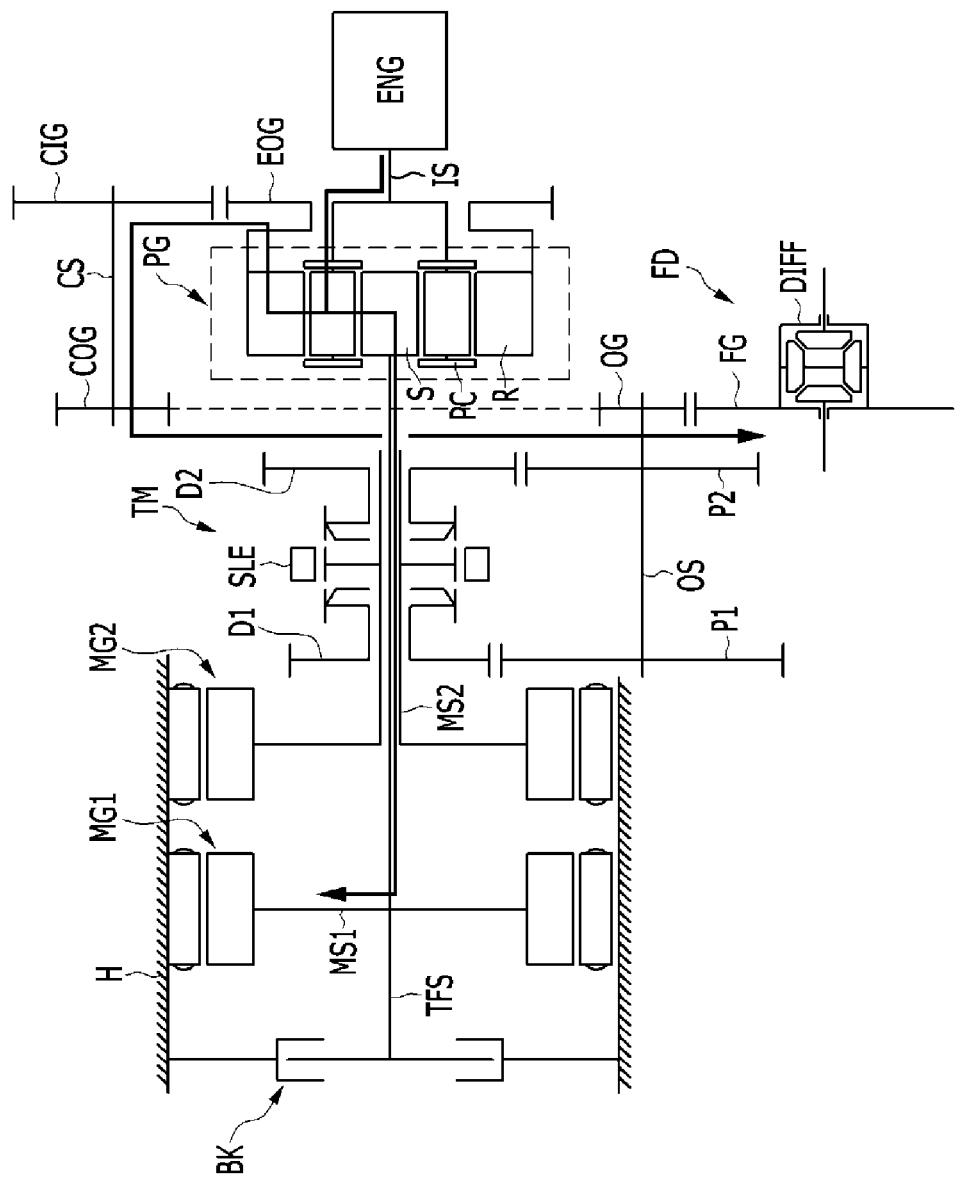
FIG. 4 shows a power delivery scheme in an HEV mode 1 of a power transmission apparatus for a hybrid vehicle according to an exemplary embodiment of the present invention.

FIG. 4 shows a power delivery scheme in an HEV mode 1 of a power transmission apparatus for a hybrid vehicle according to an exemplary embodiment of the present invention.

Referring to FIG. 4, in the HEV mode 1, the torque of the engine ENG is delivered to the planetary gear set PG, and the delivered torque is partially transmitted to the output shaft OS, and partially to the first motor/generator MG1.

In more detail, the engine torque output from the ring gear R of the planetary gear set PG is transmitted to the final reduction gear FG through the engine output gear EOG, the intermediate input gear CIG, the intermediate shaft CS, the intermediate output gear COG, and output gear OG.

In addition, the engine torque output from the sun gear S of the planetary gear set PG drives the rotor of the first motor/generator MG1 through the power delivery shaft TFS and the first motor shaft MS1, facilitating the generation of electricity by the first motor/generator MG1. The electrical energy generated by the first motor/generator MG1 is supplied to the second motor/generator MG2. Thus, the vehicle is driven in a HEV mode 1.

Figure 5:
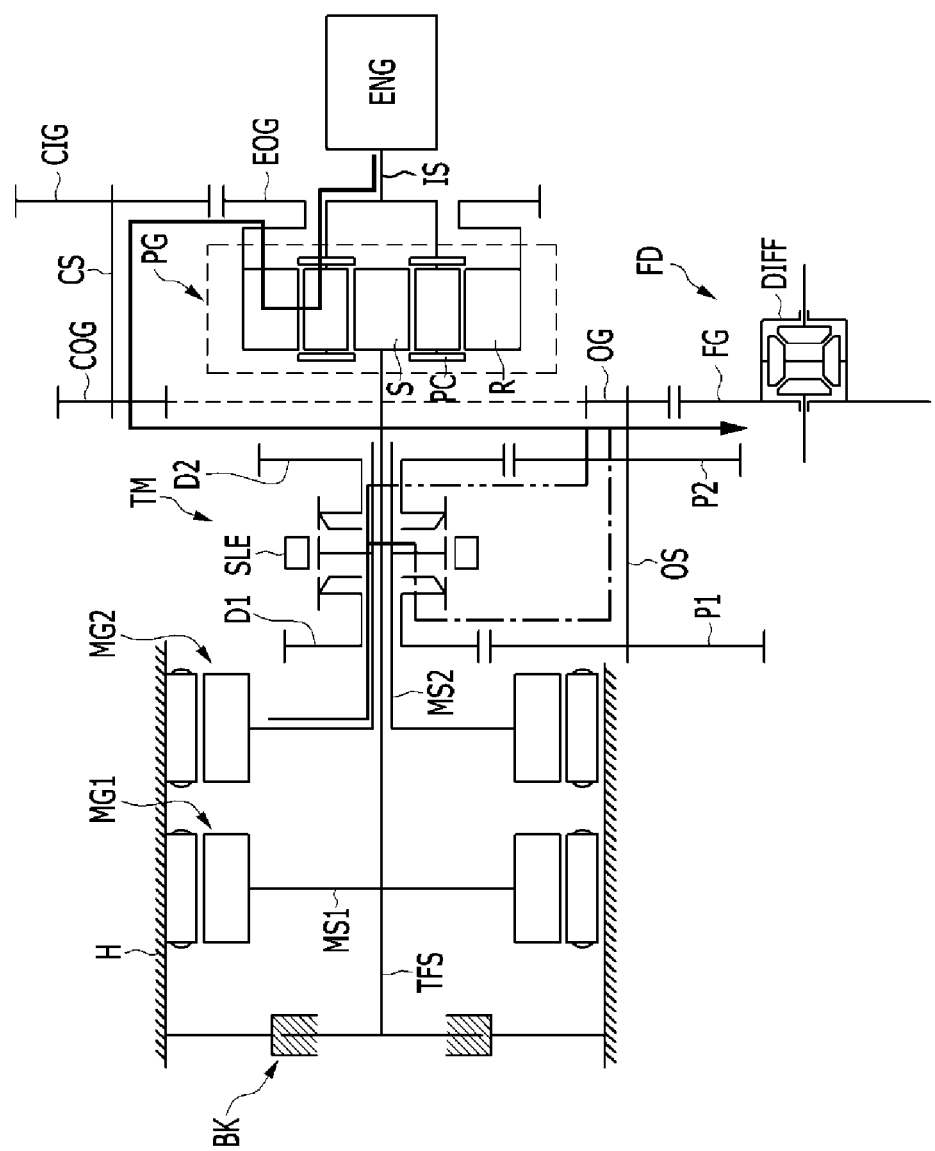
FIG. 5 shows a power delivery scheme in an HEV mode 2 of a power transmission apparatus for a hybrid vehicle according to an exemplary embodiment of the present invention.

FIG. 5 shows a power delivery scheme in an HEV mode 2 of a power transmission apparatus for a hybrid vehicle according to an exemplary embodiment of the present invention.

Referring to FIG. 5, the brake BK is operated in the HEV mode 2, in comparison with the HEV mode 1.

Accordingly, the sun gear S of the planetary gear set PG is fixed, and all engine torque is transmitted to the final reduction gear FG through the engine output gear EOG, the intermediate input gear CIG, the intermediate shaft CS, the intermediate output gear COG, and output gear OG, as in the HEV mode 1. In addition, the torque of the second motor/generator MG2 may also be transmitted to the final drive gear FG through the output gear OG in the present HEV mode 2, and the vehicle is driven by both of the torque of the engine ENG and the torque of the second motor/generator MG2.

In the present case, the torque of the second motor/generator MG2 may be transmitted to the output gear OG either in the first forward speed D1 through a route illustrated as a single-dot chain line, or in the second forward speed D2 through a route illustrated as a double-dot chain line.

However, it is notable that, when the auxiliary power of the second motor/generator MG2 is not required, the shifting device TM may be controlled to be in a neutral state wherein the vehicle is driven only by the torque of the engine ENG.

As described above, according to a power transmission apparatus for a hybrid vehicle according to an exemplary embodiment of the present invention, the torque of the second motor/generator MG2 is output to the output gear OG through the shifting device TM, facilitating two shift-stages. Thus, a required torque of the second motor/generator MG2 may be decreased and a capacity of the second motor/generator MG2 may be decreased.

According to a power transmission apparatus for a hybrid vehicle of an exemplary embodiment of the present invention, a volume of the second motor/generator MG2 may become smaller in size, reducing an overall length and weight as well as a production cost.

In addition, according to a power transmission apparatus for a hybrid vehicle of an exemplary embodiment of the present invention, an overall length of an entire transmission and motors, since the second motor/generator MG2 may be reduced in size even though the shifting device MT may be added.

For convenience in explanation and accurate definition in the appended claims, the terms "upper", "lower", "internal", "outer", "up", "down", "upwards", "downwards", "front", "back", "rear", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmission apparatus for a hybrid vehicle having an engine as a primary power source and a first motor/generator and a second motor/generator as auxiliary power sources disposed on a same axis with the engine, the power transmission apparatus comprising:
   a planetary gear set as a torque branching device disposed on the same axis with the engine; and
   a final reduction device having a final reduction gear receiving a first torque of the engine and a second torque of the second motor/generator through different paths, respectively, through an output gear formed on an output shaft,
   wherein, the first torque of the engine is delivered to the output gear through the planetary gear set and an intermediate shaft, which forms a first path of the different paths, and
   wherein the second torque of the second motor/generator is delivered to the output gear through a shifting device facilitating multi-stages of torque transmission, which forms a second path of the different paths.

2. The power transmission apparatus of claim 1, wherein the first and second motor/generators, the planetary gear set, and the shifting device are disposed in an order of the planetary gear set, the shifting device, the second motor/generator, and the first motor/generator, from an engine side.

3. The power transmission apparatus of claim 2, wherein the planetary gear set is a single pinion planetary gear set having a sun gear, a ring gear, and a planet carrier;
   the sun gear is fixedly connected to the first motor/generator through a power delivery shaft, and selectively connectable to a transmission housing;
   the planet carrier is fixedly connected to an input shaft to receive the first torque of the engine; and
   the ring gear is externally gear-meshed with the intermediate shaft.

4. The power transmission apparatus of claim 3, wherein the intermediate shaft is disposed in parallel with the input shaft;
   an intermediate input gear is disposed on the intermediate shaft and is externally gear-meshed with an engine output gear directly connected to the ring gear of the planetary gear set; and
   an intermediate output gear is disposed on the intermediate shaft and is externally gear-meshed with the output gear of the output shaft.

5. The power transmission apparatus of claim 2, wherein the shifting device includes a synchronizer device.

6. The power transmission apparatus of claim 5, wherein the shifting device further includes:
   first forward and second speed drive gears disposed on a second motor shaft without an interference therebetween, the second motor shaft being fixedly connected to the second motor/generator and coaxially superposed with a power delivery shaft without an interference therebetween, the first forward and second speed drive gears being synchronously connected to the second motor shaft, selectively by the synchronizer device; and
   first forward and second speed driven gears fixedly disposed on the output shaft and externally gear-meshed with the first forward and second speed drive gears.

\* \* \* \* \*